(12) United States Patent
Mobley

(10) Patent No.: US 11,379,624 B2
(45) Date of Patent: Jul. 5, 2022

(54) ELECTRONIC ANTI-TAMPER DEVICE

(71) Applicant: BLUESKYTEC LTD, Wells (GB)

(72) Inventor: Christopher Mobley, Wells (GB)

(73) Assignee: BLUESKYTEC LTD, Wells (GB)

( * ) Notice: Subject to any disclaimer, the term of this patent is extended or adjusted under 35 U.S.C. 154(b) by 347 days.

(21) Appl. No.: 16/496,392

(22) PCT Filed: Mar. 6, 2018

(86) PCT No.: PCT/GB2018/050569
§ 371 (c)(1),
(2) Date: Sep. 20, 2019

(87) PCT Pub. No.: WO2018/172731
PCT Pub. Date: Sep. 27, 2018

(65) Prior Publication Data
US 2020/0026888 A1    Jan. 23, 2020

(30) Foreign Application Priority Data

Mar. 20, 2017 (GB) ..................... 1704392

(51) Int. Cl.
*G06F 21/87* (2013.01)
*G01R 31/317* (2006.01)
(Continued)

(52) U.S. Cl.
CPC ....... *G06F 21/87* (2013.01); *G01R 31/31728* (2013.01); *G06F 7/588* (2013.01);
(Continued)

(58) Field of Classification Search
CPC .......... G06F 21/87; G06F 7/588; G06F 21/86; G01R 31/31728; G08B 13/128; H04L 2209/12
See application file for complete search history.

(56) References Cited

U.S. PATENT DOCUMENTS

| 4,398,089 A | 8/1983 | Sharpe |
|---|---|---|
| 2001/0033012 A1 | 10/2001 | Koemmerling et al. |

(Continued)

FOREIGN PATENT DOCUMENTS

| JP | 2003348536 A | 12/2003 | |
|---|---|---|---|
| WO | WO-2014080272 A1 * | 5/2014 | ............ G06F 7/588 |

OTHER PUBLICATIONS

Philips, E., "Alpha Radiation Visualizer," Hackaday Website, Available Online at https://hackaday.com/2006/06/25/alpha-radiation-visualizer/, Jun. 25, 2006, 1 page.

(Continued)

*Primary Examiner* — Ellen Tran
(74) *Attorney, Agent, or Firm* — McCoy Russell LLP

(57) ABSTRACT

This invention relates to an anti-tamper assembly for a circuit board comprising one or more electronic components, the assembly comprising: a container having side walls, a first, closed end and a second, opposing, open end, the container being configured to be mounted on said circuit board at said open end, over at least one of said electrical components, to form, in use, a sealed cavity around said at least one of said electrical components; a source of radioactive particles mounted within said container; an image sensor for capturing image frames within said sealed cavity, in use, wherein said image sensor comprises a detector region defining an array of pixels; and a processor for receiving said captured image frames, monitoring said image frames for changes in the statistical distribution of active pixels and, in the event that statistical distribution of active pixels indicates the presence of a feature in an image frame, generating a tamper alert.

14 Claims, 2 Drawing Sheets

(51) Int. Cl.
*G06F 7/58* (2006.01)
*G08B 13/12* (2006.01)
*G08B 13/181* (2006.01)

(52) U.S. Cl.
CPC ......... *G08B 13/128* (2013.01); *G08B 13/181* (2013.01); *H04L 2209/12* (2013.01)

(56) References Cited

U.S. PATENT DOCUMENTS

| | | |
|---|---|---|
| 2003/0025805 A1 | 2/2003 | Yamagishi |
| 2004/0022014 A1 | 2/2004 | Jeffries et al. |
| 2006/0011931 A1 | 1/2006 | Sanchez |
| 2007/0152840 A1 | 7/2007 | Fleischman et al. |
| 2008/0073491 A1 | 3/2008 | Fleischman et al. |
| 2008/0278217 A1 | 11/2008 | Hankhofer et al. |
| 2009/0262928 A1* | 10/2009 | Busari ............... H04L 9/0869 380/46 |
| 2014/0325688 A1* | 10/2014 | Cashin ............... G06F 21/86 726/34 |
| 2017/0209343 A1 | 7/2017 | Hudson et al. |
| 2018/0211035 A1 | 7/2018 | Costa |

OTHER PUBLICATIONS

ISA European Patent Office, International Search Repod Issued in Application No. PCT/GB2018/050569, dated Jun. 7, 2018, WIPO, 3 pages.

Great Britain Intellectual Property Office, Search Report under Section 17(5) Issued in Application No. GB1704392.8, dated Aug. 18, 2017, 5 pages.

"Alpha Radiation Visualizer," Invent Geek Website, Available Online at http://www.inventgeek.com/alpha-radiation-Visualizer/, Jun. 25, 2006, 17 pages.

\* cited by examiner

ELECTRONIC ANTI-TAMPER DEVICE

This invention relates generally to electronic anti-tamper devices or assemblies, for use with integrated circuit boards, to prevent, deter and/or indicate unauthorised tampering in respect thereof.

Electronic anti-tamper devices are known in the art and used primarily to protect information and/or technology in integrated circuits or multi-chip modules on printed circuit boards. Such devices are important, to not only protect the information already stored on the electronic system, but also to prevent a third party from installing malware such as viruses, worms or similar programs onto the device. For example, it is desirable to protect certain elements of devices used in financial transactions, such as point of sale devices or ATMs, wherein information obtained from such devices may be used for criminal purposes. There is also a growing desire to protect IoT devices, such as smart appliances in homes and businesses, or networks which may be connected to the internet, from becoming infected with malware. There are many different types of electronic anti-tamper devices, which provide different levels of security. Some methods simply provide an alert or notification that the device has been tampered with. Others will be configured to destroy/delete protected electronics/information in the event that unauthorised tampering is detected.

A known anti-tamper method of this type comprises putting a coating or seal over a particular component or region of a circuit board. US Patent No 2004/0222014, for example, describes a method wherein a mesh coating is provided over a circuit assembly, the mesh coating having a unique signature generated by radioactivity (α-particles). A detection module obtains an image of the signature, and tampering may be concluded if a disturbance in the signature is identified. Spaces in the mesh may include electrical components to erase circuit codes to destroy the functionality and value of the protected die if the mesh coating is disturbed.

There is an ongoing desire for an improved electronic anti-tamper device which prevents reverse engineering of any electronics protected thereby, and also provides improved protection against physical tampering, whilst minimising any additional weight, size, cost, complexity and/or power consumption often added to circuit boards by conventional anti-tamper devices.

Embodiments of the present invention seek to address at least some of these issues, and, in accordance with a first aspect of the invention there is provided an anti-tamper assembly for a circuit board comprising one or more electronic components, the assembly comprising:

a container having side walls, a first, closed end and a second, opposing, open end, the container being configured to be mounted on said circuit board at said open end, over at least one of said electronic components, to form, in use, a sealed cavity around said at least one of said electronic components;

a source of radioactive particles mounted within said container;

an image sensor for capturing image frames within said sealed cavity, in use, wherein said image sensor comprises a sensor region defining an array of pixels wherein, in respect of each pixel, a pixel is made active when the pixel is hit by a radioactive particle from said source; and a processor for receiving said captured image frames, monitoring said image frames for statistically significant changes in the distribution of active pixels, and, in the event that the statistical distribution of active pixels indicates the presence of a feature in an image frame, generating a tamper alert.

The image sensor is sensitive to ionising radiation and, in response to radioactive particles, ionisation occurs and a charge is generated. As a result, the affected pixel(s) will generate a data value representative of a grey scale or colour depth value, thus indicating 'active' pixels. During normal operation, the statistical distribution of active pixels across an image frame, and their intensity, will be statistically random with no discernible features. If tampering occurs (e.g. if the container is removed or damaged), the distribution of active pixels will become statistically significant, and 'features' will appear in the images. The processor may, for example, be configured to perform a feature extraction process on the images captured by the image sensor. In one exemplary embodiment, the processor may use Fast Fourier Analysis to transform each image from the spatial domain into the frequency domain, wherein a feature would appear as a "spike" in the resultant trace. A learning classifier may be utilised to detect the presence of a statistically significant change of this type and cause a tamper alert to be generated accordingly. A 'feature' in this context may comprise a dot of high intensity pixels or a line or shape of high intensity pixels, for example.

Advantageously, the radio active source may be a quantum source of radioactive particles, preferably α-particles. The radioactive source may optionally be Americium-241.

According to one exemplary embodiment the container may be formed of metal, such as copper.

In one exemplary embodiment of the present invention, the image sensor may be a camera having a photo-receptor region comprising a plurality of pixels, and may be configured to generate and periodically capture images within the sealed cavity, each image being representative of radioactive particles impacting pixels of the photo receptor region, and comprising a respective array of grey scale or colour depth values.

Optionally, the sensor region may be a complementary metal-oxide semiconductor (CMOS) detector surface, although a charge coupled device (CCD) or, indeed, any other suitable image sensor, sensitive to non-ionising and ionising radiation, may be used.

In one exemplary embodiment the assembly may further comprise a power source mounted within the container, and electrically coupled to the processor and image sensor.

The container, radioactive source and image sensor assembly used in the first aspect of the present invention has another unique use/advantage in that it can be used as part of a random number generator.

Thus, according to a second aspect of the present invention there is provided a random number generator comprising a sealed container within which is mounted a quantum random source of radioactive particles and an image sensor comprising a sensor region in the form of an array of pixels, the random number generator further comprising a processor for receiving, from said image sensor, captured image frames from within said sealed container representative of active pixels, each captured image data set comprising an array of grey scale or colour depth values in respect of said array of pixels, and for combining, in respect of each captured image data set, said respective grey scale or colour depth values to generate a single respective number.

The numbers, thus generated, will be entirely random because the statistical distribution of active pixels across each image frame, and their intensity (represented by the grey scale/colour depth values) will be statistically random.

These random numbers can be fed to a cryptographic module, on the same circuit board or even elsewhere, for use in one of a number of cryptographic processors requiring the use of truly random numbers.

These and other aspects of the present invention will be apparent from the following specific description in which embodiments of the present invention are described, by way of examples only, and with reference to the accompanying drawings, in which.

Figure 1:
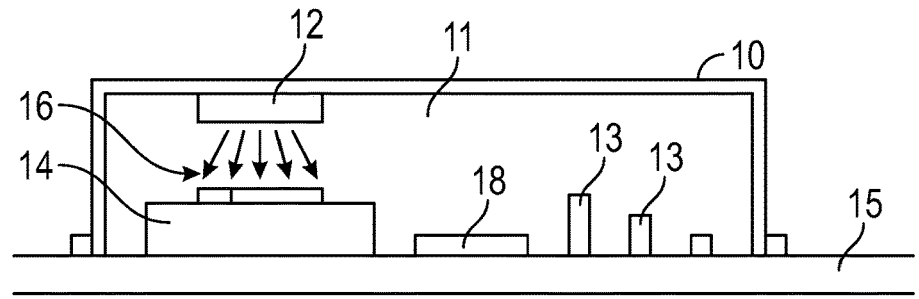
FIG. 1 is a schematic side view of inside an anti-tamper device according to one exemplary embodiment of the present invention.
Figure 2:
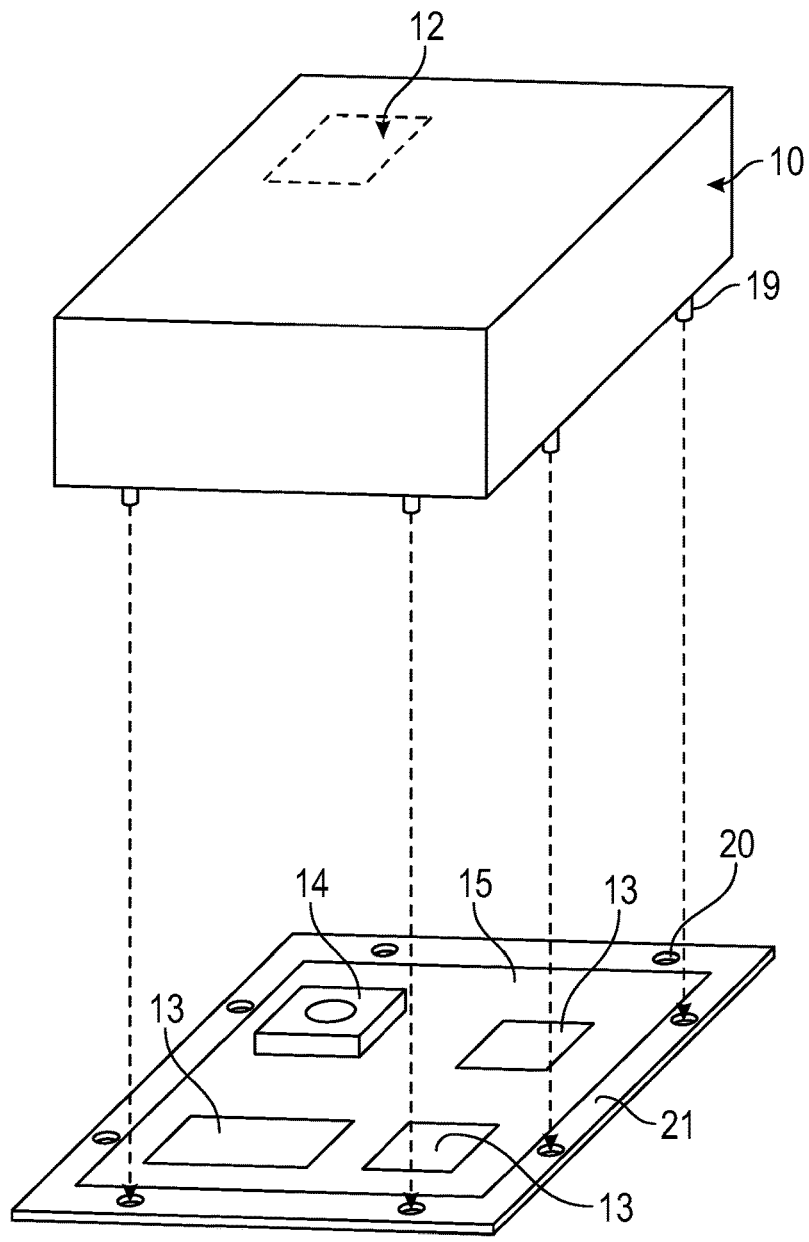
FIG. 2 is a schematic top-perspective view of the anti-tamper device of FIG. 1.
Figure 3:
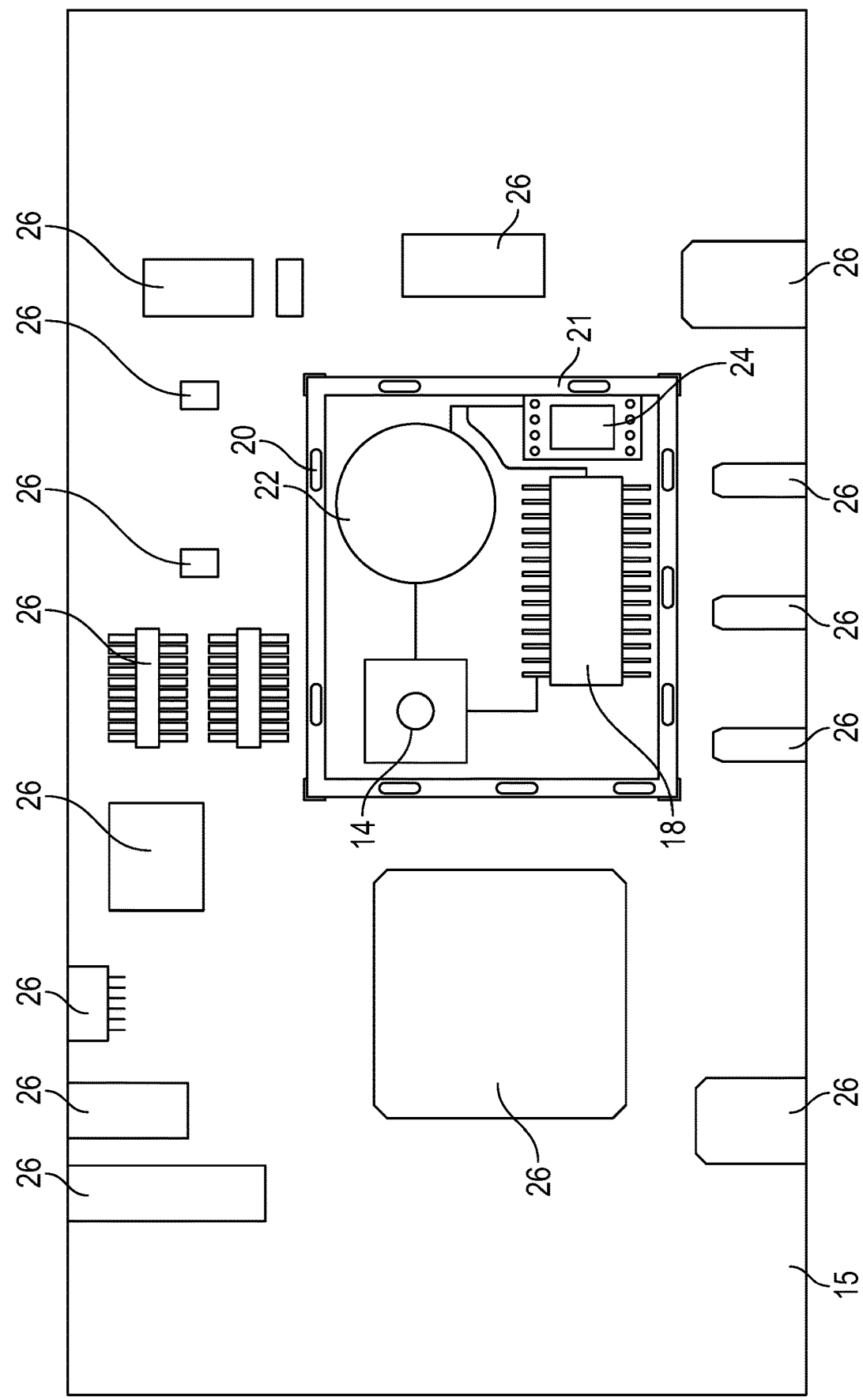
FIG. 3 is a schematic diagram of a Printed Circuit Board (PCB) with the device of FIG. 1.

Referring to FIGS. 1 to 3 of the drawings, an anti-tamper assembly according to an exemplary embodiment of the present invention comprises a box or can 10 having side walls, a top wall and an open bottom end. In the exemplary embodiment illustrated, the box/can 10 is of generally square or rectangular lateral cross-section. However, the present invention is not necessarily intended to be limited in this regard, and the box/can 10 could, for example, be generally cylindrical, with a generally circular lateral cross-section. The box/can 10 is configured to be mounted over one or more components 13 on a printed circuit board (PCB) 15, so as to provide anti-tamper functionality to that/those component(s) 13. The PCB 15 is provided with a uniform (uninterrupted) layer 21, of, for example, copper that surrounds the component(s) to be protected, and the box/can 10 is mounted, at the (lower) open end onto the layer 21 to form a sealed cavity 11 around the component(s) 13. The layer 21 thus forms an anti-tamper boundary around the component(s) 13 to be protected, and the box/can 10 is soldered onto the boundary layer 21 to form a sealed cavity around the component(s) 13. It will be appreciated that the directional terms such as 'top', 'bottom', 'lower', 'vertical', 'lateral', etc. refer to the described assembly when oriented for use, i.e. when the PCB 15 is horizontal and generally parallel to the ground. However, it will be appreciated that, in some applications, the PCB 15 may not necessarily be so oriented, thus altering the orientation of the associated anti-tamper assembly.

The box/can 10 is advantageously formed of a hard metal, such as copper, which is highly resilient to damage, deterioration and deformation, as well as being capable of blocking radioactive particles, particularly α- and β-particles with a relatively thin wall. However it will be appreciated by a person skilled in the art that alternative materials could be used, and the present invention is not necessarily intended to be limited in this regard.

A quantum source 12 of radiation is mounted, or otherwise provided on the inner surface of the top wall of the box/can 10. In a preferred embodiment, the radioactive source is selected to produce a constant random source of α-particles, since α-particles have a short range and are relatively easily blocked by thin layers of material, even paper, such that the walls of the box/can 10 can be made relatively very thin such that the additional weight/cost added to the PCB by the anti-tamper assembly is minimised. A suitable radioactive source 12 of this type might be Americium 241, which is known for use in smoke detectors and the like, is considered to be relatively safe for humans when handled appropriately, and has a relatively long half-life. However the present invention is not necessarily intended to be limited in this regards and other suitable radioactive sources will be apparent to a person skilled in the art. Indeed, a radioactive source that emits β-particles could be used, but then the walls of the box/can 10 may need to be made thicker (approximately 2 mm thick for β-particles up to an energy of 4 MeV) for safety reasons, thereby increasing the weight and cost of the assembly.

A sensor 14 is mounted on the PCB 15, within the cavity 11, and located generally below the radioactive source 12 with the detector region thereof facing the radioactive source 12. The sensor 14 may be a camera, such as a CMOS camera or charge coupled device (CCD) camera with the lens removed, although any detector sensitive to ionising radiation can be used and the present invention is not necessarily intended to be limited in this regard. The image sensor comprises an array of M by N pixels. In use, the radioactive source 12 emits radioactive particles 16 which fill, and are contained within, the cavity 11. When a particle 16 hits a pixel of the image sensor it causes a change in energy, which generates a charge on the pixel, making it 'active'. This charge, and its intensity, is typically quantified in terms of a corresponding grey scale or colour depth value, and each set of active pixels is output in the form of a respective image frame. Because the motion of the particles 16 within the sealed cavity 11 conforms to Brownian motion, it is a random process where the individual particles 16 experience random interactions with each other. Thus, each captured image (i.e. pattern of grey scale or colour values) is entirely random and will never (statistically) repeat (to the level of digitisation of the camera. Thus, a VGA camera produces 640×480 pixels, with a 16 bit grey scale or colour depth, giving over 20 billion possible images, whereas an XGA camera produces 1024×768 pixels with a 24 grey scale or colour depth, giving over 13 trillion possible images.

Images are captured periodically within the sealed cavity 11, and the resultant array of grey scale or colour pixel values of each captured frame can be used to generate a random number using any suitable combination of the captured values. For example, the captured pixel values may simply be multiplied or added together, although other suitable algorithms will be apparent to a person skilled in the art. Irrespective of the manner in which the values representative of a captured image frame are combined to generate a value, a series of such numbers will be thus generated over time, and can be fed to a separate cryptographic module for use therein in one of a number of cryptographic processes requiring the use of random numbers.

During normal operation, i.e. when no tampering has occurred, the statistical distribution of the active pixels across each image frame, and their intensity, will be statistically random, with no discernible 'features', in other words, the images are representative of the emission from the quantum random source of α-particles (in this case). However, if any tampering occurs such that, for example, the seal on the container is broken or the contained random source of radioactive particles is otherwise disturbed, then features will start to appear in the image frames which are statistically significant and, therefore, indicate a tamper. 'Features' in this context may be a dot of high intensity pixels or a line or shape of high intensity pixels for example.

A processor 18 is provided on the PCB 15 to a) receive the captured images in the form of an array of greyscale/colour values and use those values to generate a representative random number; and b) monitor the images and, if features are detected, generate a tamper alert. To this end, a number of different 'feature' detection or extraction processes may be utilised by the processor 18 and will be apparent to a person skilled in the art. For example, the processor 18 may be configured to transform each image from the spatial domain to the frequency domain. Features in an image will appear in the frequency domain as "spikes". Thus, a learning classifier may be employed within the processor 18 to identify "spikes", or other statistically significant events, in the frequency trace and generate a tamper alert if such an event is identified. The processor 18 may also be configured to take into account longer-term changes in the statistical distribution and intensity over time, due to a drop in radioactivity due to radioactive decay. However Americium has a half-life of 432 years, so it is not expected that there will be a noticeable change in intensity from year to year.

Referring back to FIGS. 2 and 3 of the drawings, the PCB 15 is illustrated without the copper box/can 10 mounted thereon. Downwardly protruding teeth 19 on the bottom (open) end of the box/can 10 are aligned with holes 20 which extend into and/or through the PCB 15 (illustrated best in FIG. 2). The teeth 19 fit into the holes 20 and can be soldered therein, thus sealing the copper box 10 onto the circuit board with the relevant components sealed within the cavity 11. Referring in particular to FIG. 3, a plan view of a PCB 15 is shown, including the holes 20 for receiving the teeth 19 of the copper box 10. A plurality of other electronic components and chips 26 which are not to be protected by the anti-tamper device are also illustrated. Therefore, the copper box 10 can be used to protect part of a PCB 15 and the electronic components 13 which require protection located therein.

In order to power the sensor 14 and processor 18, a battery 22 may be provided on the PCB 15 and contained within the cavity 11.

Thus, in the exemplary embodiment illustrated, the battery and components of the anti-tamper device are all contained within the box or can 10. Furthermore, the device may be electrically isolated from the rest of the PCB (except the electronic components 13). This is additionally advantageous as it means the anti-tamper device is securely contained within the box 10 and cannot be tampered with itself, e.g. the power source cannot be cut nor the processor removed.

This device secures an electronic system from tamper by physical, electro-magnetic and radioactive interference. The concept is to have a physically secure cavity 11 that detects mechanical impact, electro-magnetic and radiation impinging upon the secure cavity 11. Within this cavity electronic components 13 that need security will be located. The functionality of the assembly can be summarised thus: a) the cavity 11 is formed by soldering a copper box/can 10 to a PCB 15 with uninterrupted copper layers; b) the cavity 11 is filled with radioactive particles 16 from a radioactive source which preferably produces predominantly α-particles, such as Americium-241 and a camera captures images within the sealed cavity 11; c) a processor 18 reads the image frames, which comprise an array of greyscale or colour depth values, and processes them for statistically significant events; d) the processor, located within the cavity, will generate and alert signal if unauthorised tampering is detected. The processor may be configured to erase or destroy its contents if unauthorised tampering is detected.

Statistically significant events within the images (i.e. 'features') can occur for a number of reasons. If, for example, the box/can 10 is breached where there are no photons to flood the photo sensor, then the tamper will still be detected, as the camera 14 will be shifted in position relative to the radioactive source. This alters the image statistics, and the processor detects this as unauthorised tampering, and therefore will generate the alert signal. Emissions by high-energy particles, such as those which may be emitted by Scanning Electron Microscopes, or other radiation (e.g. X-rays) will result in the sensitivity of the CMOS detector surface being altered away from the statistical norm of the sealed cavity 11. High-energy particles will cause "hot-spots" on the CMOS detector surface (i.e. constant high grey scale or colour depth values which don't vary between images) and will thus alter the image statistics. Each of these cases results in the processor detecting a sudden change, and generating an alert signal.

It will be understood by those skilled in the art that modifications and variations of the exemplary embodiment described herein may be made without departing from the scope of protection as defined in the appended claims.

The invention claimed is:

1. An anti-tamper assembly for a circuit board comprising one or more electronic components, the assembly comprising:
    a container having side walls, a first, closed end and a second, opposing, open end, the container being configured to be mounted on said circuit board at said open end, over at least one of said electronic components, to form, in use, a sealed cavity around said at least one of said electronic components;
    a source of radioactive particles mounted within said container;
    an image sensor for capturing image frames within said sealed cavity, in use, wherein said image sensor comprises a detector region defining an array of pixels wherein, in respect of each pixel, a pixel is made active when the pixel is hit by a radioactive particle from said source; and
    a processor for receiving said captured image frames, monitoring said image frames for changes in a statistical distribution of active pixels and, in an event that the statistical distribution of active pixels indicates the presence of a feature in an image frame, generating a tamper alert.

2. The anti-tamper assembly according to claim 1, wherein each image frame is represented by a spatial array of grey scale or colour depth values associated with respective active pixels.

3. The anti-tamper assembly according to claim 2, wherein said processor is configured to, in respect of each of a plurality of image frames, generate a respective random number by combining said grey scale or colour depth values.

4. The anti-tamper assembly according to claim 1, wherein said radioactive source comprises a quantum random source of radioactive particles.

5. The anti-tamper assembly according to claim 1, wherein said radioactive source generates α-particles.

6. The anti-tamper assembly according to claim 1, wherein said radioactive source is Americium-241.

7. The anti-tamper assembly according to claim 1, wherein said container is formed of a metal, such as copper.

8. The anti-tamper assembly according to claim 1, wherein said processor is configured to perform a feature extraction process on said image frames and, in the event that the feature is detected in the image frame, generate the tamper alert.

9. The anti-tamper assembly according to claim 8, wherein said processor is configured to transform each said image frame from a spatial domain to a frequency domain and use said frequency domain to perform said feature extraction technique.

10. The anti-tamper assembly according to claim 9, wherein said processor includes a learning classifier configured to identify statistically significant events in said frequency domain and, in the event that a statistically significant event is identified, cause the tamper alert to be generated.

11. The anti-tamper assembly according to claim 1, wherein said detector region of said image sensor is a complementary metal-oxide semiconductor (CMOS) detector surface or a charge coupled device (CCD).

12. The anti-tamper assembly according to claim 1, wherein the assembly further comprises a power source mounted within said container.

13. An anti-tamper circuit board assembly, comprising:
a circuit board comprising one or more electronic components;
wherein the circuit board is provided with a uniform layer that surrounds at least one electronic component to be protected; and
a container having side walls, a first, closed end and a second, opposing, open end, the container being mounted on said circuit board at said open end, onto the uniform layer, over said at least one electronic component, to form a sealed cavity around said at least one electronic component;
a quantum random source of radioactive particles mounted on an inner surface of the first, closed end of said container;
an image sensor, provided on the circuit board, for capturing image frames within said sealed cavity, in use, wherein said image sensor comprises a detector region defining an array of pixels wherein, in respect of each pixel, a pixel is made active when the pixel is hit by a radioactive particle from said source; and
a processor, provided on the circuit board, for receiving said captured image frames, monitoring said image frames for changes in a statistical distribution of active pixels and, in an event that the statistical distribution of active pixels indicates a presence of a feature in an image frame, generating a tamper alert.

14. An anti-tamper assembly for a circuit board comprising one or more electronic components, the assembly, comprising:
a container having side walls, a first, closed end and a second, opposing, open end, the container being configured to be mounted on said circuit board at said open end, over at least one of said electronic components, to form, in use, a sealed cavity around said at least one of said electronic components;
a source of radioactive particles mounted within said container;
an image sensor for capturing image frames within said sealed cavity, in use, wherein said image sensor comprises a detector region defining an array of pixels wherein, in respect of each pixel, a pixel is made active when the pixel is hit by a radioactive particle from said source;
a processor for receiving said captured image frames, monitoring said image frames for changes in a statistical distribution of active pixels and, in an event that the statistical distribution of active pixels indicates a presence of a feature in an image frame, generating a tamper alert, and
a power source electrically coupled to the processor and image sensor, the power source being mounted within said container.

* * * * *